Sept. 20, 1960 J. A. MANINTVELD ET AL 2,953,729

CRYSTAL DIODE

Filed April 29, 1957

INVENTOR
JAN ADRIANUS MANINTVELD
HENDRICUS GERARDUS KOCK

BY Frank R. Jifari
AGENT

United States Patent Office 2,953,729
Patented Sept. 20, 1960

2,953,729

CRYSTAL DIODE

Jan Adrianus Manintveld and Hendrikus Gerardus Kock, both of Eindhoven, Netherlands, assignors to North American Philips Company, Inc., New York, N.Y., a corporation of Delaware Filed Apr. 29, 1957, Ser. No. 655,868

Claims priority, application Netherlands May 26, 1956

6 Claims. (Cl. 317—234)

The invention relates to a crystal diode consisting of a thin wafer or disc-like body of semi-conductive material, provided on one side with an ohmic connection and on the other side with a rectifying connection, of which connections at least one is a fused connection. The other connection may be obtained, for example, by means of fusion or by diffusion.

A fused connection is to be understood to mean a connection produced by a known method, which consists in that to a semi-conductive body a quantity of contact material is applied, which contains active impurities, donors and/or acceptors, after which the assembly is heated to a temperature such that a melt of contact material is formed on the semi-conductive body, a small quantity of semi-conductive material dissolving in this melt and recrystallizing after cooling with a content of impurity thus forming a layer having a conductivity and/or conductivity type differing from that of the semi-conductive body, the further solidified contact material settling down on this layer.

With crystal diodes it is, in general, common practice and also desirable, with respect to the properties of the material, inter alia the small diffusion length of the minority carriers in the semi-conductive material, to arrange the ohmic and the rectifying connection opposite one another one on each side of the disc of semi-conductive material, so that they are at a minimum distance from one another. With thin, semi-conductive discs it is natural to centre the connections, since the electric stray resistance of centred connections is at a minimum.

However, it has been found that this construction may result in a poor blocking characteristic, if the semi-conductive disc is thin, for example 100 $\mu$.

The invention is based on the recognition of the fact that a high blocking current occurs since during the cooling of the fused contact, stresses are produced in the semi-conductive body, resulting in cracks in thin discs, these cracks extending right across the semi-conductive disc from the fused connection to the other side, where the other contact is provided, these cracks being filled with a moist atmosphere which permits ions to pass along these paths. To this recognition contributes the fact that, when using such a crystal diode in high-vacuum the high reverse current drops materially and assumes a normal value. This difficulty will particularly arise when the contact material and the semi-conductive material are both brittle and have a great difference in expansion coefficients.

The invention has for its object to provide a simple structure, in which the aforesaid difficulty is avoided. It is particularly important for use with crystal diodes, in which particularly the requirements for the blocking characteristic are severe.

With a crystal diode according to the invention the connections on each side of the disc are arranged relatively to one another in a manner such that the geometric projection of the ohmic connection perpendicularly to the opposite side falls outside the boundary of the rectifying connections. With respect to the finite penetration depth of the cracks this structure is particularly important with crystal diodes, of which the semi-conductive disc is thinner than 150 $\mu$. The ohmic connection may, for example, be applied in the form of a ring around the rectifier contact on the side opposite this rectifying connection.

With a very simple construction of the crystal diode, both the ohmic and the rectifying connection are applied by alloying for example a globule, a wire or a pill of contact material. Particularly with this construction it is important to shift in place the connections in the aforesaid manner, since otherwise on both sides from the alloy contacts on the tensions and cracks penetrate into the semi-conductive disc. By displacing the connections from the central position over a distance such that the minimum distance between the projection and the boundary is at least equal to the thickness of the semi-conductive disc, the occurrence of cracks can, in general, be avoided completely. As a matter of course, the connections should not be removed farther from one another than is required with respect to the blocking characteristic, since the displacement brings about a decrease in forward current.

The invention is especially important for crystal diodes of which the semi-conductive disc is made of silicon, since silicon is a brittle material having a comparatively low expansion coefficient, while most of the contact materials used for silicon or the alloys of these materials with silicon, for example, an alloy of 75% by weight of gold and 25% by weight of antimony or an aluminum-silicon alloy, are also brittle and have a comparatively high expansion coefficient. Measures carried out on crystal diodes containing a semi-conductive disc of p-type silicon, provided with an ohmic fused connection of aluminum and a rectifying fused connection of an alloy of 75% by weight of gold and 25% by weight of antimony, have proved that the occurrence of cracks can usually be suppressed completely by displacing the fused connections from the centred positions over such a distance that the minimum distance between the projection of the ohmic connection and the boundary of the rectifying connection is at least equal to the thickness of the semi-conductive disc or preferably twice this thickness or more, so that the reverse current is reduced by about a factor 100 or more, while the forward current, in accordance with the lifetime of the minority carriers in the semi-conductive material, decreases only by a factor of about 3 to 10. The forward current is reduced only when the average distance between the connections is a few times the diffusion length of the minority carriers.

It should be noted that the invention relates only to crystal diodes and does not relate to photo-cells and transistors. With the latter semi-conductive electrode systems the connections may be applied in displaced positions for quite different reasons, which do not play any part with crystal diodes. For example, with a transistor, in order to obtain a high current amplification factor, the rectifying connections will be applied opposite one another in a manner such that the ohmic contact lies at the side of these connections, since the area opposite each of the two rectifying connections is occupied, with photo-diodes the ohmic contact will be applied as near as possible the edge of the semi-conductive disc, in order that the radiation can penetrate without the smallest possible degree of attenuation into the surroundings of the blocking layer.

The invention will now be described more fully with reference to a few figures, which show a few embodiments of a crystal diode according to the invention.

Figures 1, 2, 3:
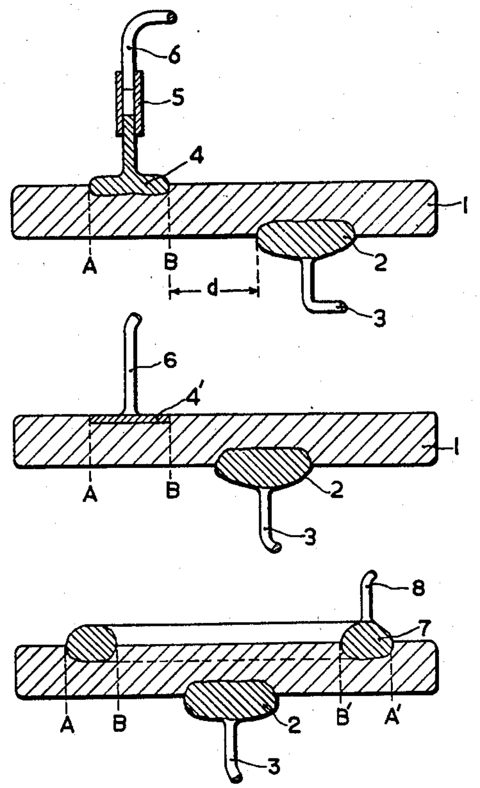
Figs. 1 to 3 show, in a longitudinal sectional view, embodiments of a crystal diode according to the invention.

Fig. 1 shows an alloy diode. The semi-conductive disc 1 consists of p-type silicon with a resistivity of 20 ohm/cm. and has a thickness of about 100 μ. On one side a fused rectifying connection 2 is provided by melting down contact material consisting of an alloy of 25% by weight of antimony and 75% by weight of gold. The penetration depth is about 30 μ. To this connection is soldered a nickel supply wire 3. In a displaced position relative to this connection the other side of the semi-conductive disc is provided with the ohmic contact 4 by melting down aluminum wire. The projection of this connection, which has a penetration depth of about 40 μ, is indicated on the opposite side in the section by the line AB.

The minimum distance *d* of the boundary to the projection is about 300 μ. To this aluminum connection 4 is secured by means of a nickel pinching contact 5 a copper supply wire 6.

The construction shown in Fig. 2 corresponds largely with that shown in Fig. 1, with the exception that the ohmic alloy connection is replaced by a diffusion contact 4' and that the contacts are nearer one another. This diffusion connection may, for example, be obtained by applying by vaporisation locally a gallium layer to the semi-conductive body 1 and by heating the structure for some time at 1100° C., so that the gallium is diffused into the semi-conductive disc. The connection area is then electrolytically copper-plated, after which a copper supply wire 6 is secured by soldering.

In Fig. 3 the ohmic connection is constituted by an alloyed ring 7 of contact material, to which a supply wire 8 is secured. On the opposite side, within this ring, the rectifying connection 2 is applied, which is also provided with a supply wire 3.

Figure 4:
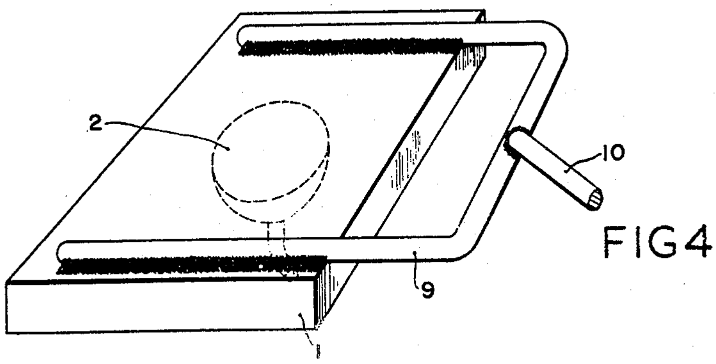
Fig. 4 is a perspective view of another embodiment.

With the embodiment shown in Fig. 4 the two ends of a U-shaped wire 9 of contact material are melted tight to the semi-conductive body 1. The connection may, for example, be used as an ohmic contact and is connected at the junction between the two ends to a supply wire 10. On the opposite side, between the two ends, the rectifying connection 2 is provided.

The effect of the invention is furthermore evident from the following data. The crystal diode shown in Fig. 1 had a reverse current, up to a blocking voltage of 80 v., of less than 0.1 μa., whereas the reverse current of a crystal diode having its contacts centred opposite one another, this diode being otherwise identical with that shown in Fig. 1, was already 10 μa., at 20 v.

What is claimed is:

1. A semi-conductor diode comprising a wafer-shaped body having opposed surfaces and a body thickness between the surfaces below about 150 microns and constituted of a relatively brittle semi-conductive material, a fused electrical connection at one of the said opposed surfaces of said body and of a material whose expansion coefficient substantially differs from that of the semi-conductive material, and another electrical connection to the other opposed surface, every connection to the said other opposed surface being spaced from the projection of the fused connection onto the said other opposed surface, whereby the connections are in non-overlying relationship.

2. A diode as set forth in claim 1 wherein the body is of silicon, and the fused connection is a brittle material.

3. A diode as set forth in claim 2 wherein the spacing between the projection of the fused connection and the other connections is not less than twice the body thickness.

4. A semi-conductor diode comprising a wafer-shaped silicon body having opposed surfaces and a body thickness between the surfaces of less than 150 microns, a fused rectifying connection of a brittle material whose expansion coefficient substantially differs from that of silicon at about the center of one surface of the body, and an ohmic connection at the other surface of the body and spaced from the projection of the fused connection onto the said other surface by a distance greater than the body thickness, said two connections constituting the only electrical connections to the body.

5. A diode as set forth in claim 4 wherein the fused connection is of aluminum.

6. A diode as set forth in claim 4 wherein the fused connection is of gold-antimony.

References Cited in the file of this patent

UNITED STATES PATENTS

| | | |
|---|---|---|
| 2,777,974 | Brattain et al. | Jan. 15, 1957 |
| 2,796,563 | Ebers et al. | June 18, 1957 |
| 2,798,189 | Alexander | July 2, 1957 |
| 2,805,347 | Haynes et al. | Sept. 3, 1957 |
| 2,820,932 | Looney | Jan. 21, 1958 |
| 2,859,286 | Kennedy | Nov. 4, 1958 |